1

United States Patent [19]
Acker et al.

[11] Patent Number: 5,221,751
[45] Date of Patent: Jun. 22, 1993

[54] HETEROCYCLIC POLYMETHINE DYES WITH CARBAMATE OR AMIDE GROUPS

[75] Inventors: Michael Acker, Heidelberg; Bernhard Albert, Maxdorf; Sibylle Brosius; Klaus D. Schomann, both of Ludwigshafen; Harald Kuppelmaier, Goennheim, all of Fed. Rep. of Germany

[73] Assignee: BASF Aktiengesellschaft, Ludwigshafen, Fed. Rep. of Germany

[21] Appl. No.: 702,495

[22] Filed: May 20, 1991

[30] Foreign Application Priority Data

May 21, 1990 [DE] Fed. Rep. of Germany ....... 4016298

[51] Int. Cl.$^5$ .................................. C07D 403/06
[52] U.S. Cl. .................................. 548/455; 548/411
[58] Field of Search ........................ 548/455, 411

[56] References Cited

U.S. PATENT DOCUMENTS

| | | | |
|---|---|---|---|
| 4,513,142 | 4/1985 | Rave et al. .......................... | 548/455 |
| 4,847,385 | 7/1989 | Kusakata .............................. | 548/455 |
| 4,908,294 | 3/1990 | Kanno et al. ........................ | 430/270 |

FOREIGN PATENT DOCUMENTS

| | | |
|---|---|---|
| 0342810 | 11/1989 | European Pat. Off. . |
| 3505750 | 8/1986 | Fed. Rep. of Germany . |
| 3505751 | 8/1986 | Fed. Rep. of Germany . |
| 3721850 | 1/1989 | Fed. Rep. of Germany ...... 548/455 |
| 1001480 | 8/1965 | United Kingdom . |
| 1184496 | 3/1970 | United Kingdom . |

OTHER PUBLICATIONS

Methoden der Organischen Chemie, vol. V/1d, 3 pages, 1972.
Dyes and Pigments, vol. 8, 1987, pp. 381-388, S. H. Kim, et al., "Syntheses and Characteristics of Infrared Absorbing 2:1 Nickel Complex Dyes".

*Primary Examiner*—David B. Springer
*Attorney, Agent, or Firm*—Oblon, Spivak, McClelland, Maier & Neustadt

[57] ABSTRACT

Polymethine dyes suitable for use in an optical recording medium have the formula

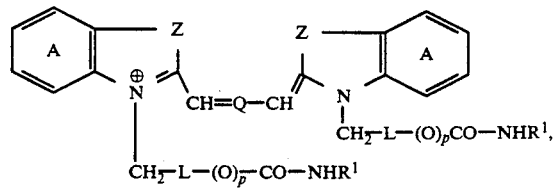

where
p is 0 or 1,
Z is nitrogen, oxygen, sulfur, isopropylidene, cyclohexylidene or the radical —CH=CH—,
Q is a radical of the formula

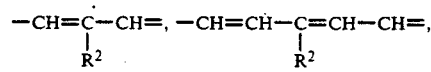

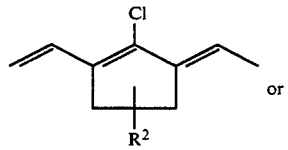 or

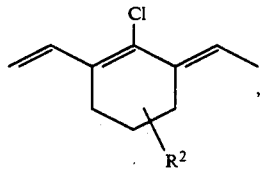

where $R^2$ is hydrogen, chlorine, bromine or $C_1$-$C_6$-alkyl,
L is $C_1$-$C_{12}$-alkylene, or a single bond
$R^1$ is hydrogen, substituted or unsubstituted $C_1$-$C_{20}$-alkyl, substituted or unsubstituted $C_5$-$C_7$-cycloalkyl or substituted or unsubstituted phenyl,
$X^\ominus$ is an anion, and the rings A may each be substituted or benzofused.

3 Claims, No Drawings

HETEROCYCLIC POLYMETHINE DYES WITH CARBAMATE OR AMIDE GROUPS

The present invention relates to novel polymethine dyes of the formula I

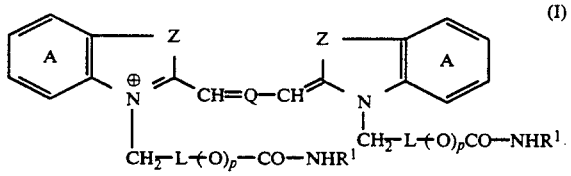

where
p is 0 or 1,
Z is nitrogen, oxygen, sulfur isopropylidene cyclohexylidene or the radical —CH=CH—,
Q is a radical of the formula

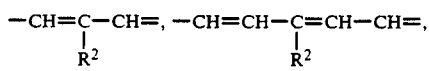

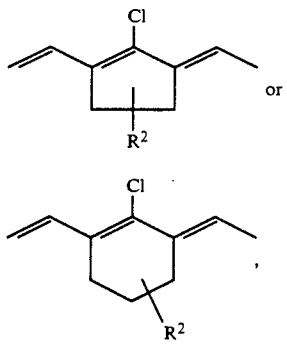

where $R^2$ is hydrogen, chlorine, bromine or $C_1$-$C_6$-alkyl,
L is $C_1$-$C_{12}$-alkylene, or a single bond
$R^1$ is hydrogen, $C_1$-$C_{20}$-alkyl which may be substituted by hydroxyl, halogen or phenyl and which may be interrupted by one or more oxygen atoms in ether function, substituted or unsubstituted $C_5$-$C_7$-cycloalkyl or substituted or unsubstituted phenyl,
$X^{\ominus}$ is an anion, and the rings A may each be substituted or benzofused, and to an optical recording medium based on the novel dyes.

For use in an optical recording medium a dye must meet a particular set of requirements. For instance, the dye should be strongly absorbing within the wavelength range of commercial semiconductor lasers (700-900 nm) and should also be highly reflecting within said range. In addition, it should be highly soluble in order that a thin storage film may be preparable by spin coating. The storage films produced should be homogeneous and stable to outside influences over a prolonged period. The recording medium should be writable and subsequently readily readable by means of a semiconductor laser and have a very high signal-to-noise ratio.

GB-A-1 001 480 discloses trimethine dyes which contain inter alia benzothiazole, benzoxazole and indole groups.

However, the prior art dyes are all deficient in at least one of the abovementioned requirements.

It is an object of the present invention to provide novel dyes which are completely or at least substantially free of such defects.

We have found that this object is achieved by the polymethine dyes of the formula I defined in more detail at the beginning.

We have also found an optical recording medium comprising a support and a thin film which is sensitive to laser light and contains a polymethine dye of the formula I with or without a binder.

Any alkyl appearing in the abovementioned parts of the formula I may be either straight-chain or branched.

L is for example methylene, ethylene, 1,2- or 1,3-propylene, 1,2-, 1,3-, 2,3- or 1,4-butylene, pentamethylene, hexamethylene, heptamethylene, octamethylene, nonamethylene, decamethylene, undecamethylene or dodecamethylene.

When $R^1$ is substituted $C_1$-$C_{20}$-alkyl, suitable substituents are for example hydroxyl, phenyl, halogen, $C_1$-$C_4$-alkanoyl or $C_1$-$C_4$-alkoxycarbonyl. The alkyl chain may additionally be interrupted by one or more, in particular from 1 to 3, oxygen atoms in ether function.

When the rings A in the formula I are substituted, suitable substituents are for example $C_1$-$C_6$-alkyl, halogen, in particular chlorine or bromine, hydroxyl, $C_1$-$C_6$-alkoxy, cyano, amino, $C_1$-$C_6$-monoalkylamino, $C_1$-$C_6$-dialkylamino or phenyl.

When $R^1$ is substituted $C_5$-$C_7$-cycloalkyl, suitable substituents are for example $C_1$-$C_4$-alkyl, chlorine or bromine.

When $R^1$ is substituted phenyl, suitable substituents are for example $C_1$-$C_4$-alkyl, $C_1$-$C_4$-alkoxy or halogen, in particular chlorine or bromine.

$R^1$ is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, icosyl (the terms isooctyl, isononyl, isodecyl and isotridecyl are trivial names derived from oxo process alcohols (cf. Ullmanns Encyclopädie der technischen Chemie, 4th edition, Volume 7, pages 215-217, and Volume 11, pages 435 and 436)), benzyl, 1- or 2-phenylethyl, trifluoromethyl, trichloromethyl, bromomethyl, 2-bromoethyl, 1,1,1-trifluoroethyl, heptafluoropropyl, 4-bromobutyl, 2-methoxyethyl, 2-ethoxyethyl, 2-propoxyethyl, 2-butoxyethyl, 2-benzyloxyethyl, 2- or 3-methoxypropyl, 2- or 3-ethoxypropyl, 2- or 3-isopropoxyethyl, 3-benzyloxypropyl, 2- or 4-ethoxybutyl, 5-ethoxypentyl, 6-methoxyhexyl, 3,6-dioxaheptyl, 3,6-dioxaoctyl, 3,6-dioxadecyl, 3,6,9-trioxadecyl, 4-oxa-6-ethyldecyl, 3,6-dioxa-7-phenylheptyl, ethoxycarbonylmethyl, 2-ethoxycarbonylethyl, 2- or 3-methoxycarbonylpropyl, 2-hydroxyethyl, 2- or 3-hydroxypropyl, 2- or 4-hydroxybutyl, 5-hydroxypentyl, 6-hydroxyhexyl, 7-hydroxyheptyl, 8-hydroxyoctyl, cyclopentyl, cyclohexyl, cycloheptyl, 3-methylcyclopentyl, 4-methylcyclohexyl, 4-ethylcyclohexyl, 2,3-dichlorocyclohexyl, phenyl, 2-methylphenyl, 4-methoxyphenyl, 2-chlorophenyl or 2,4-dichlorophenyl.

Q is for example

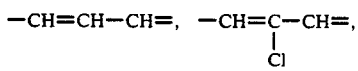
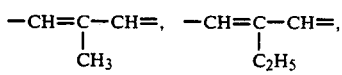
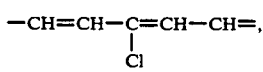
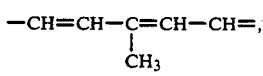
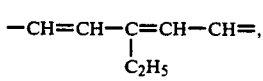
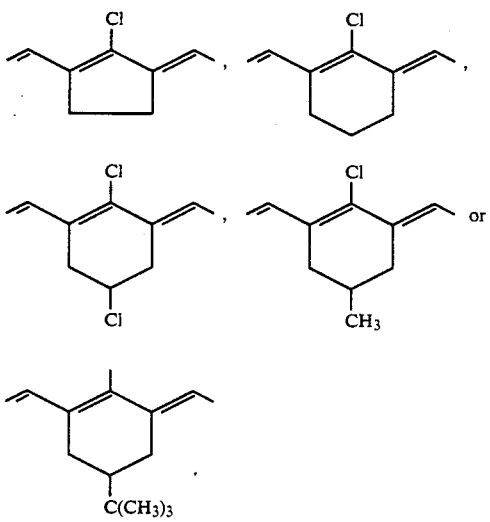

$X^\ominus$ in the formula I is an anion. Both inorganic and organic anions are possible. Suitable anions are for example halide, such as chloride, bromide or iodide, sulfate, perchlorate, phosphate, hexafluoroantimonate, tetrafluoroborate, trichlorozincate, methanesulfonate, benzenesulfonate, hexafluorophosphate, 4-methylbenzenesulfonate, acetate, lactate, salicylate and tetraphenylboranate.

$X^\ominus$ may also be for example an anion of a heteropolyacid based on tungsten and/or molybdenum and also phosphorus, silicon, vanadium, cobalt, aluminum, manganese, chromium and/or nickel. Another possibility is for example the copper(I) hexacyanoferrate(II) anion.

The preparation of heteropolyacids and salts thereof is known. The acids are obtained by acidifying solutions of the tungstenates, molybdates and/or vanadates in the form of the alkali metal and/or ammonium salts in the presence of phosphate and/or water-soluble silicates. By varying the ratios of tungstate, molybdate, vanadate and phosphate and the silicic acid or salts thereof it is possible to synthesize various heteropolyacids. Examples of heteropolyacids are: molybdatophosphoric acid, molybdatosilicic acid, tungstenatophosphoric acid, tungstenatosilicic acid, vanadatophosphoric acid, vanadatosilicic acid, tungstenatomolybdatophosphoric acid, tungstenatomolybdatosilicic acid, tungstenatovanadatophosphoric or -silicic acid and tungstenatomolybdatosilicic or -phosphoric acid, which may additionally contain vanadium.

$X^\ominus$ may also be, for example, an anionic transition metal chelate complex, for example a nickel dithiolate anion of the formula

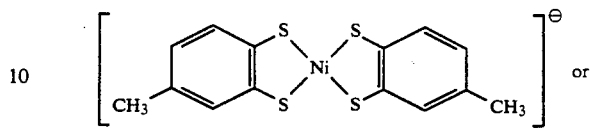

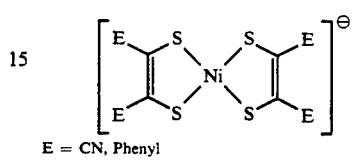

E = CN, Phenyl

Preference is given to polymethine dyes of the formula I where

Z is sulfur, isopropylidene, cyclohexylidene or the radical —CH=CH—, and $R^1$ is hydrogen, $C_1$-$C_{20}$-alkyl, which may be substituted by phenyl or hydroxyl and which may be interrupted by from 1 to 3 oxygen atoms in ether function, $C_5$-$C_7$-cycloalkyl or phenyl.

Particular preference is given to those polymethine dyes of the formula I where

Z is isopropylidene or cyclohexylidene,

Q is a radical of the formula

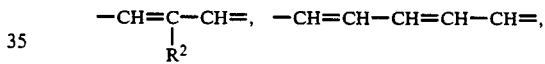

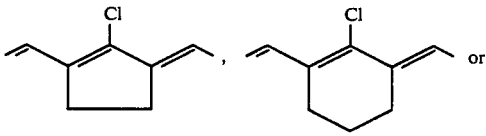

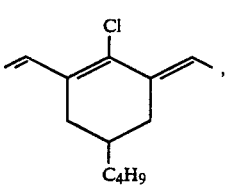

where $R^2$ is hydrogen, chlorine, bromine or methyl,

L is $C_1$-$C_5$-alkylene, or a single bond

R is hydrogen, $C_1$-$C_{18}$-alkyl which may be substituted by phenyl or hydroxyl and which may be interrupted by from 1 to 3 oxygen atoms in ether function, cyclohexyl or phenyl, and the rings A may each be substituted by chlorine or benzofused.

Preferred anions $X^\ominus$ are chloride, bromide, iodide, tetrafluoroborate, perchlorate, 4-methylbenzenesulfonate and hexafluorophosphate.

The dyes of formula I can be prepared by condensing active methylene heterocyclic compounds of the formula II, where p, Z, $R^1$, A and $X^\ominus$ are each as defined above, with suitable C-1, C-3 or C-5 units in an acid or alkaline medium in the presence of an inert solvent at from 40° to 150° C.

This is described by the following scheme:

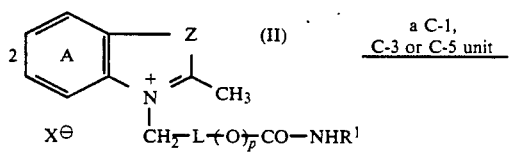 a C-1,
C-3 or C-5 unit

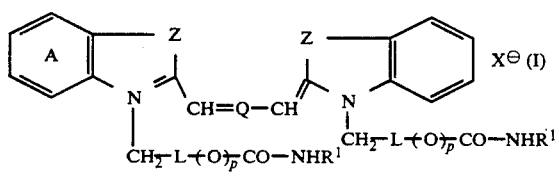

Suitable C-1, C-3 or C-5 units are, for example: C-1: HC(OC$_2$H$_5$)$_3$;

C-3:
C$_6$H$_5$N=CH—CH=CH—NHC$_6$H$_5$.HCl,
C$_6$H$_5$N=CH—C(CH$_3$)=CH—NHC$_6$H$_5$.HCl,
C$_6$H$_5$N=CH—CBr=CH—NHC$_6$H$_5$.HBr,
(CH$_3$O)$_2$CH—CH$_2$—CH(OCH$_3$)$_2$,
C$_2$H$_5$O—CH=CH—CH(OC$_2$H$_5$)$_2$,
C$_6$H$_5$N=CH—CCl=CH—NHC$_6$H$_5$.HCl or

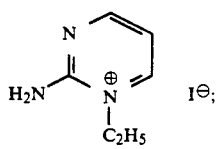

C-5:
C$_6$H$_5$N=CH—CH=CH—CH=CH—NHC$_6$H$_5$.HCl

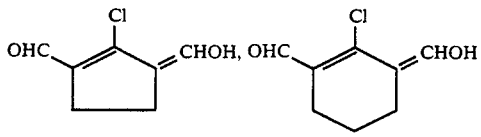

or

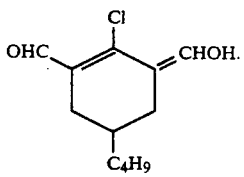

This method of preparing polymethine dyes is known per se, being described for example in Houben-Weyl "Methoden der Organischen Chemie", Volume 5/1d, page 227.

The active methylene heterocyclic compounds of the formula II with an amide substitution pattern are obtained for example by quaternizing heterocycles of the formula III

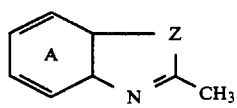

where A and Z are each as defined above, with carboxamides of the formula IV

Hal—L—CO—NHR$^1$ (IV)

where R$^1$ and L are each as defined above and Hal is halogen.

Those compounds of the formula II which have a carbamate substitution pattern are obtained in a similar manner by reacting heterocycles of the formula III with carbamates of the formula V Br—L—O—CO—NHR$^1$ (V)

where L and R$^1$ are each as defined above.

The compounds of the formula II are prepared in a conventional manner. For example, by reacting the neutral heterocyclic compound of the formula III with a carboxamide of the formula IV or with a carbamate of the formula V in an inert solvent (eg. butyronitrile, toluene, 1,1,2-trichloroethane or naphtha) at from 20° to 160° C.

The polymethine dyes of the formula I have a high molar absorption coefficient. They are very readily soluble in organic solvents, in particular lower alcohols, such as methanol, ethanol or propanol, and in thermoplastic or crosslinked materials (binders).

It is a further object of the present invention to provide a novel optical recording medium which is simple to prepare. The medium should be readily writable and subsequently readily readable with a high signal-to-noise ratio. In addition, the recording medium shall be highly stable. We have found that this object is achieved by an optical recording medium comprising a support and a thin film which is sensitive to laser light and contains a dye with or without a binder, wherein the dye is a polymethine dye of the formula I

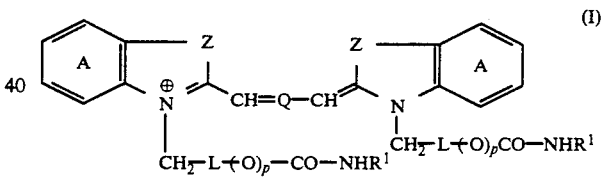

where
p is 0 or 1,
Z is nitrogen, oxygen, sulfur, isopropylidene, cyclohexylidene or the radical —CH=CH—,
Q is a radical of the formula

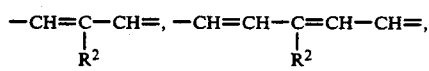

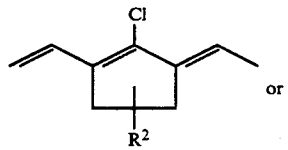

or

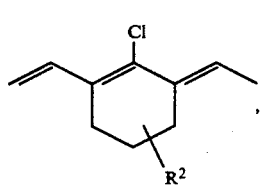

where $R^2$ is hydrogen, chlorine, bromine or $C_1-C_6$-alkyl,

L is $C_1-C_{12}$-alkylene, or a single bond $R^1$ is hydrogen, $C_1-C_{20}$-alkyl which may be substituted by hydroxyl, halogen or phenyl and which may be interrupted by one or more oxygen atoms in ether function, substituted or unsubstituted $C_3-C_7$-cycloalkyl or substituted or unsubstituted phenyl, $X^\ominus$ is an anion, and the rings A may each be substituted or benzofused.

Preference is given to an optical recording medium containing a polymethine dye of the formula I where Z is sulfur, isopropylidene, cyclohexylidene or the radical —CH=CH—, and $R^1$ is hydrogen, $C_1-C_{20}$-alkyl, which may be substituted by phenyl or hydroxyl and which may be interrupted by from 1 to 3 oxygen atoms in ether function, $C_5-C_7$-cycloalkyl or phenyl.

Particular preference is given to an optical recording medium containing a polymethine dye of the formula I where Z is isopropylidene or cyclohexylidene, Q is a radical of the formula $$-CH=\underset{R^2}{C}-CH=, \quad -CH=CH-CH=CH-CH=,$$

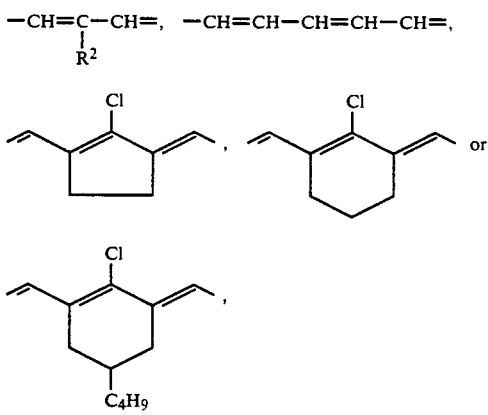

where $R^2$ is hydrogen, chlorine, bromine or methyl,

L is $C_1-C_6$-alkylene, or a single bond $R^1$ is hydrogen, $C_1-C_{16}$-alkyl which may be substituted by phenyl or hydroxyl and which may be interrupted by from 1 to 3 oxygen atoms in ether function, cyclohexyl or phenyl, and the rings A may each be substituted by chlorine or benzofused.

The supports used are advantageously transparent supports, such as glass or plastics. Suitable plastics are for example poly(meth)acrylates, polycarbonates, polyesters, epoxides, polyolefins (eg. polymethylpentene), polyamide, polyvinyl chloride, polystyrene and polyvinyl esters.

A preferred recording medium has a support made of polycarbonate or poly(meth)acrylates, but in particular polycarbonate.

Preference is further given to an optical recording medium containing from 1 to 30% by weight, based on the dye, of a binder.

As mentioned above, the novel polymethine dyes are readily soluble in most organic solvents, so that these dyes can be spincoated directly (without protective layer) onto structured plastic substrates, in particular polycarbonate substrates.

As stated above, the spincoating solution preferably contains a binder to ensure the long-term stability of the recording medium and in particular to allow the viscosity of the spincoating solution to be optimized. Suitable binders are for example silicone resins, epoxides, poly(meth)acrylates, polystyrene homopolymers and copolymers, polyvinylcarbazole, polyvinylpyrrolidone, polyvinyl ester copolymers, polyvinyl ether copolymers, polyvinylidene chloride copolymers, acrylonitrile copolymers, polyvinyl chloride and copolymers thereof, cellulose acetate and nitrocellulose.

The optical recording medium of the present invention is advantageously prepared by spincoating with a solution containing an organic solvent, one or more polymethine dyes I and optionally a binder. This spincoating solution advantageously has a solids content of from 1 to 30% by weight, based on the solution.

Suitable solvents are for example propanol, isopropanol, butanol, diacetone alcohol, methyl ethyl ketone, toluene, 1,1,2-trichloroethane and mixtures thereof.

The spincoating solution may additionally contain additives such as antioxidants, singlet oxygen quenchers or UV absorbers. Preferably, the spincoating solution contains up to 5–10% by weight, based on the solids content of the spincoating solution, of a mixture of a plurality of antioxidants, singlet oxygen quenchers and UV absorbers. If singlet oxygen quenchers, such as nickel dithiol complexes (DE-A-3 505 750, DE-A-3 505 751, Dyes and Pigments, 8 (1987), 381–88) are used, up to 10% by weight, based on the solids content of the spincoating solution, may be present in the solution.

In the optical recording medium of the present invention, the laser light sensitive film is present in the form of a homogeneous, thin, smooth layer of high optical quality. The reflectivities are in general in the range > 15%. Furthermore, the novel recording medium is sufficiently sensitive at the wavelength of the laser used that the threshold energy is favorable and the information to be stored can be written in as pits, which gives an excellent signal-to-noise ratio.

The recording medium of the present invention is very stable to atmospheric influences and daylight.

Particularly suitable light sources, on account of their small size, low energy consumption and the possibility of direct modulation of the optical power output through modulation of the electric drive current, are solid state injection lasers which emit in the near infrared, in particular the AlGaAs laser, which emits within the wavelength range from 750 to 900 nm.

The invention is further illustrated by the following Examples:

A) PREPARATION OF THE DYES

EXAMPLE 1

4.1 g (9.5 mmol) of 1-[(N-hexylcarbamoyl)methyl]-2,3,3-trimethyl-3H-indolium iodide and 1.4 g (4.9 mmol) of glutaconaldehyde bisanil hydrochloride were dissolved in 20 ml of ethanol. The reaction mixture was heated to the refluxing point, 1 ml of acetic anhydride was added at that temperature, the mixture was stirred at that temperature for a further 2 minutes and then 2.6 ml (19 mmol) of triethylamine were added dropwise. The deep bluish green solution was refluxed for a further 10 minutes and then admixed with 0.75 g (5 mmol) of sodium iodide. It was then slowly cooled down with stirring, and the dye-containing solution was added dropwise to 350 ml of methyl tert-butyl ether. The precipitated dye was filtered off with suction, washed with ether and dried under reduced pressure. This left 6.6 g of the polymethine dye of the formula

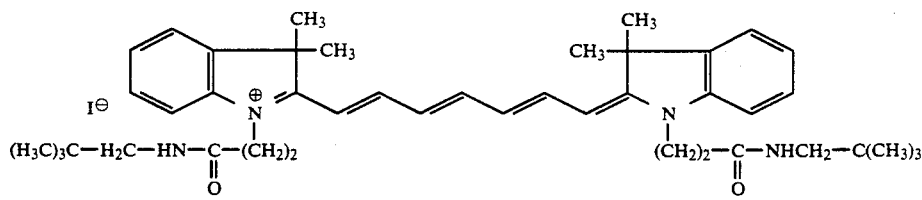

as a green, metallically gleaming solid.

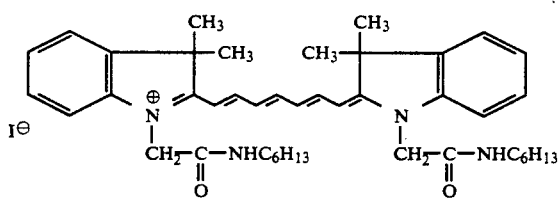

The dye was further purified by chromatography over silica gel using 10:2 v/v methylene chloride/ethanol as mobile phase. Melting point: 165–167° C.; $\lambda_{max}=741$ nm (MeOH).

EXAMPLE 2

3.2 g (20 mmol) of 2,3,3-trimethyl-3H-indole and 4.5 g (20 mmol) of N-isopentyl-3-bromopropionamide were dissolved in 20 ml of xylene and the mixture was stirred under reflux for 8 hours. 100 ml of methyl tert-butyl ether were then slowly added at that temperature, the mixture was cooled down, and the supernatant was decanted off, leaving the precipitate behind. The precipitated amorphous indolenium salt was then stirred up once more with methyl tert-butyl ether, the supernatant was decanted again and the residue was dissolved in 30 ml of ethanol. 2.85 g (10 mmol) of glutaconaldehyde bisanil hydrochloride were then added, and the reaction mixture was stirred under reflux for 5 minutes. 2 ml of acetic anhydride were then slowly added, the mixture was stirred under reflux for a further 3 minutes, and 5.2 ml (7 mmol) of triethylamine were added. This was followed after a further 3 minutes by 1.5 g (0.01 mol) of sodium iodide, and the solution, after it had cooled down to room temperature, was introduced into 150 ml of methyl tert-butyl ether with stirring. 1.5 g of the polymethine dye of the formula were obtained in the form of metallically gleaming crystals following chromatography over silica gel with 10:2 v/v methylene glycol/ethanol as mobile phase; melting point: 165°–167° C.; $\lambda_{max}=760$ nm (CH$_2$Cl$_2$)

EXAMPLE 3

25.2 g (135 mmol) of 5-chloro-2,3,3-trimethyl-3H-indole and 35 g (143 mmol) of N-phenyl-O-(2-bromoethyl)urethane were heated at 140° C. for 3 hours. The mixture was then cooled down to 80° C., 200 ml of methyl tert-butyl ether were added, and the mixture was stirred at room temperature for 1.5 hours. The crystallized indolenium salt was filtered off with suction, washed with ether and dried under reduced pressure. Yield: 68 g; melting point: 130° C.

4.4 g (10 mmol) of the indolenium salt and 0.87 g (5 mmol) of 2-chloro-1-formyl-3-hydroxymethylenecyclohex-1-ene were introduced into 40 ml of acetic anhydride, and the mixture was heated at 140° C. with stirring for 15 minutes. It was then cooled back to room temperature and admixed with 1.5 g (0.01 mol) of sodium iodide in 10 ml of methanol. The reaction solution was then added with stirring to 500 ml of methyl tert-butyl ether, and the precipitated dye was filtered off with suction. The dye was taken up in 20 ml of methylene chloride, insolubles were filtered off, and the solvent was then concentrated under reduced pressure. This left 2.6 g of polymethine dye of the formula

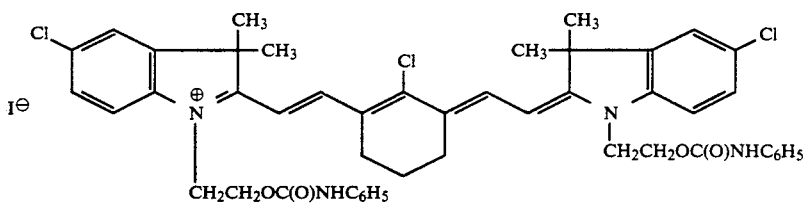

as metallically gleaming crystals; $\lambda_{max}=798$ nm (CH$_2$Cl$_2$).

The dyes listed hereinafter were obtained in a similar manner:

| Example No. | | $\lambda_{max}$ [nm] |
|---|---|---|
| 4 | (structure) | 741 (MeOH) |

-continued
| Example No. | | $\lambda_{max}$ [nm] |
|---|---|---|
| 5 | 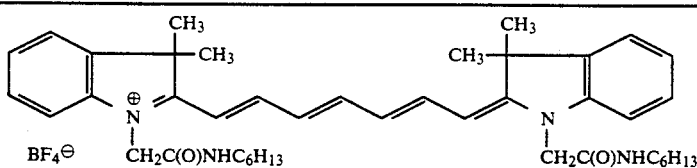 | 741 (MeOH) |
| 6 | 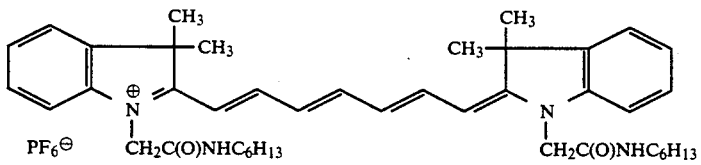 | 741 (MeOH) |
| 7 | 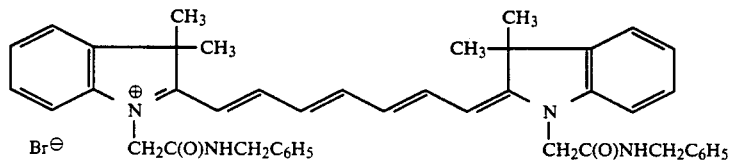 | 741 (MeOH) |
| 8 | 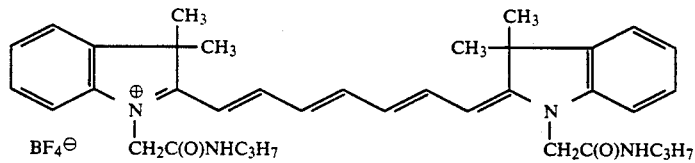 | 741 (MeOH) |
| 9 | 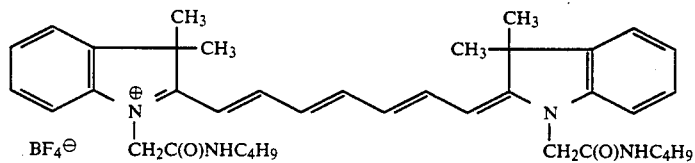 | 741 (MeOH) |
| 10 | 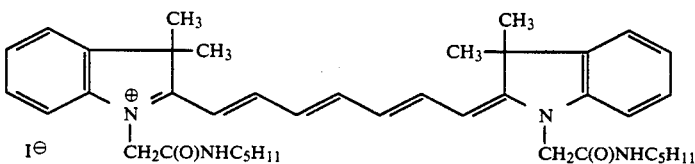 | 741 (MeOH) |
| 11 | 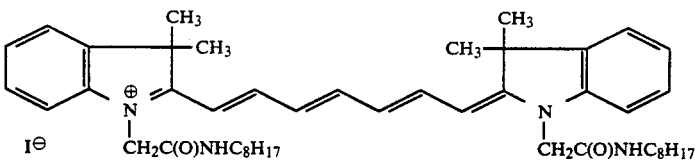 | 741 (MeOH) |
| 12 | 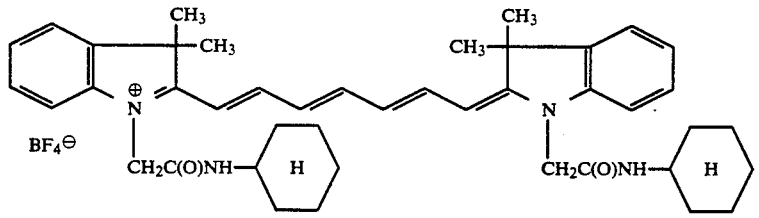 | 741 (MeOH) |
| 13 | 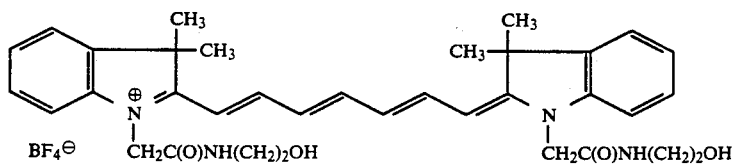 | 741 (MeOH) |

-continued
| Example No. | | $\lambda_{max}$ [nm] |
|---|---|---|
| 14 | 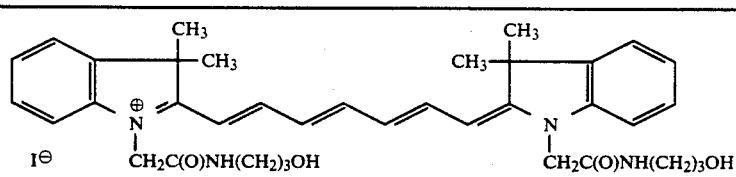 | 741 (MeOH) |
| 15 | 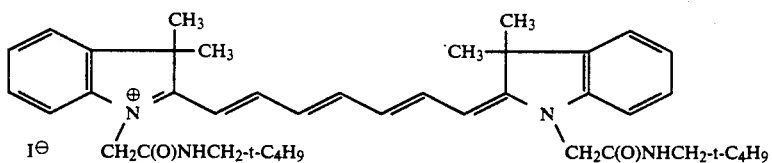 | 742 (MeOH) |
| 16 | 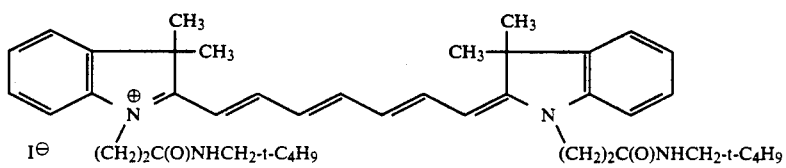 | 760 (CH$_2$Cl$_2$) |
| 17 | 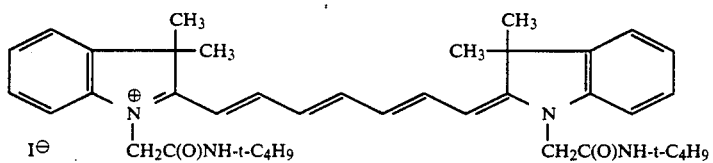 | 752 (CH$_2$Cl$_2$) |
| 18 | 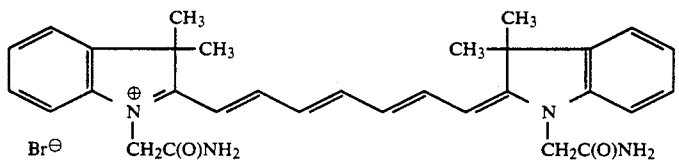 | 741 (MeOH) |
| 19 | 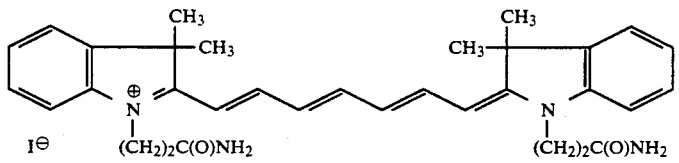 | 760 (CH$_2$Cl$_2$) |
| 20 | 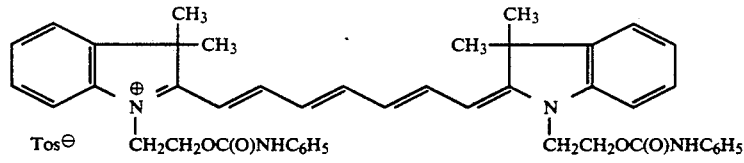 | 748 (EtOH) |
| 21 | 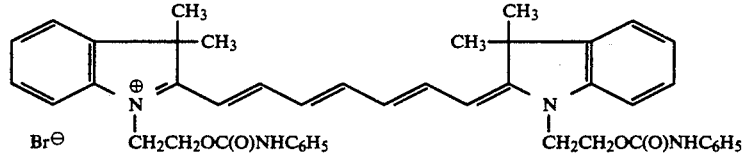 | 759 (CH$_2$Cl$_2$) |
| 22 | 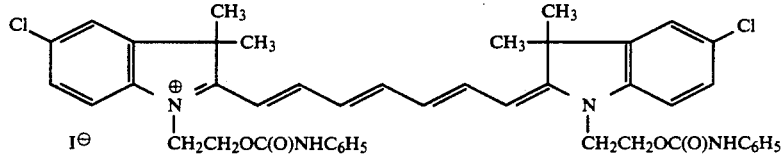 | 766 (CH$_2$Cl$_2$) |

-continued
| Example No. | | $\lambda_{max}$ [nm] |
|---|---|---|
| 23 | 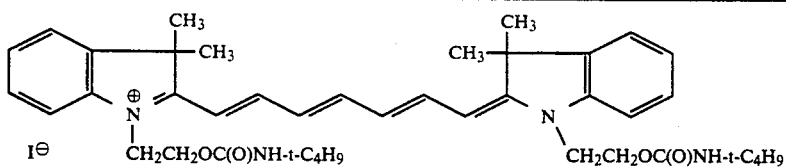 | 758 (CH$_2$Cl$_2$) |
| 24 | 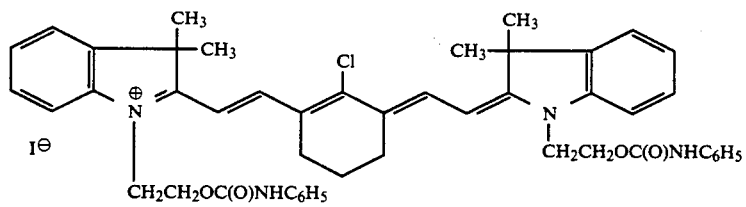 | 790 (CH$_2$Cl$_2$) |
| 25 | 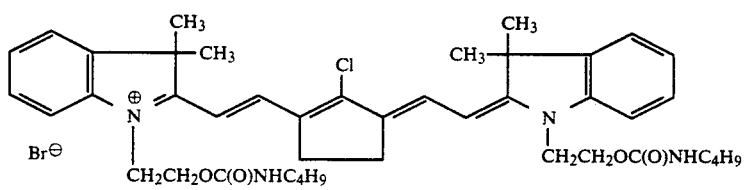 | 807 (EtOH) |
| 26 | 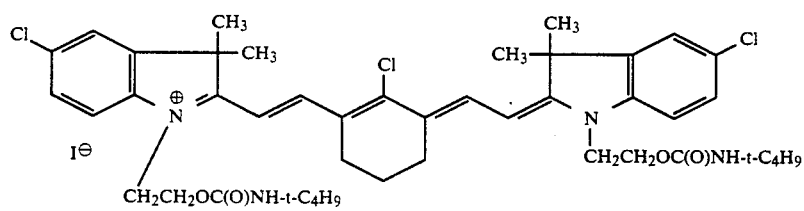 | 798 (CH$_2$Cl$_2$) |
| 27 | 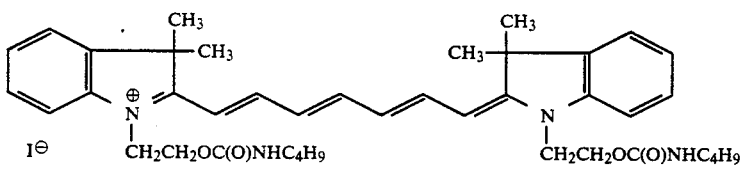 | 759 (CH$_2$Cl$_2$) |
| 28 | 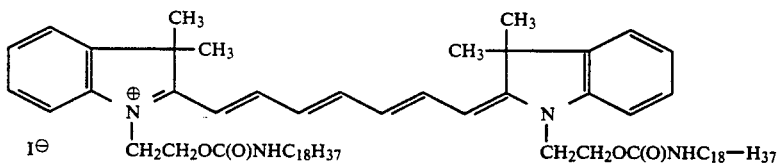 | 760 (CH$_2$Cl$_2$) |
| 29 | 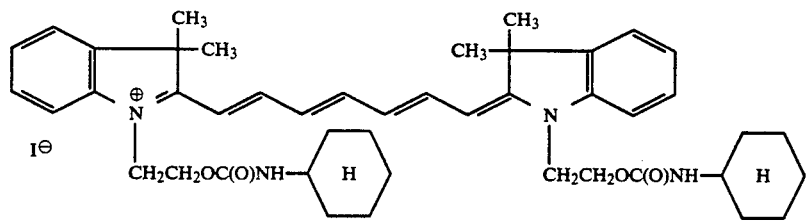 | 760 (CH$_2$Cl$_2$) |
| 30 | 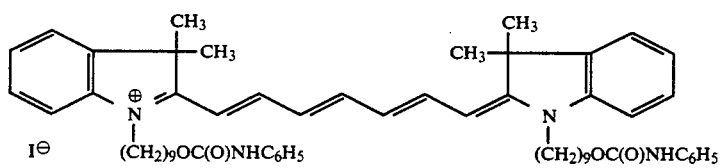 | 760 (CH$_2$Cl$_2$) |

-continued

| Example No. | Structure | $\lambda_{max}$ [nm] |
|---|---|---|
| 31 | (structure) I⁻, N⁺–CH₂CH₂OC(O)NH-t-C₄H₉ / N–CH₂CH₂OC(O)NH-t-C₄H₉ | 759 (CH₂Cl₂) |
| 32 | (structure) I⁻, N⁺–(CH₂)₉OC(O)NHC₄H₉ / N–(CH₂)₉OC(O)NHC₄H₉ | 759 (CH₂Cl₂) |
| 33 | (structure with Cl and t-C₄H₉ on cyclohexene bridge) I⁻, N⁺–CH₂CH₂OC(O)NHC₆H₅ / N–CH₂CH₂OC(O)NHC₆H₅ | 760 (CH₂Cl₂) |
| 34 | (structure) I⁻, N⁺–CH₂C(O)NHC₆H₁₃ / N–CH₂C(O)NHC₆H₁₃ | 653 (CH₂Cl₂) |
| 35 | (structure) BF₄⁻, N⁺–CH₂C(O)N-t-C₄H₉ / N–CH₂C(O)NH-t-C₄H₉ | 653 (CH₂Cl₂) |
| 36 | (structure) I⁻, N⁺–CH₂CH₂C(O)NHCH₂C(CH₃)₃ / N–CH₂CH₂C(O)NHCH₂C(CH₃)₃ | 653 (CH₂Cl₂) |
| 37 | (structure) I⁻, N⁺–CH₂C(O)NHCH₂C(CH₃)₃ / N–CH₂C(O)NHCH₂C(CH₃)₃ | 653 (CH₂Cl₂) |
| 38 | (structure) I⁻, N⁺–CH₂C(O)NHC₄H₉ / N–CH₂C(O)NHC₄H₉ | 653 (CH₂Cl₂) |

-continued
| Example No. | | $\lambda_{max}$ [nm] |
|---|---|---|
| 39 | 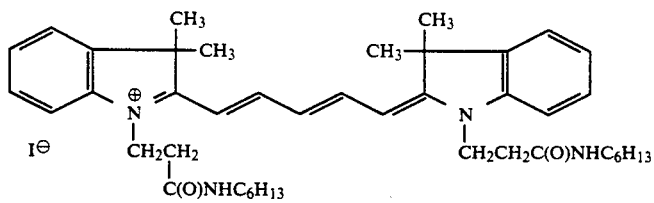 | 653 (CH$_2$Cl$_2$) |
| 40 | 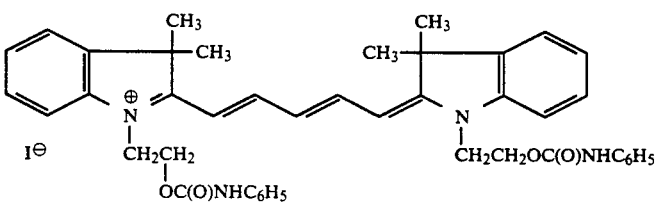 | 654 (CH$_2$Cl$_2$) |
| 41 | 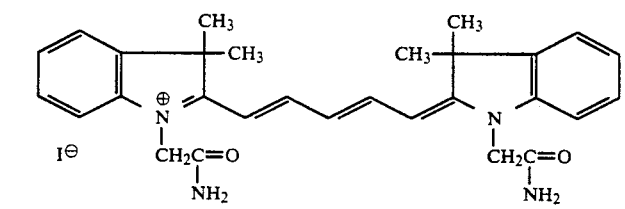 | 653 (CH$_2$Cl$_2$) |
| 42 | 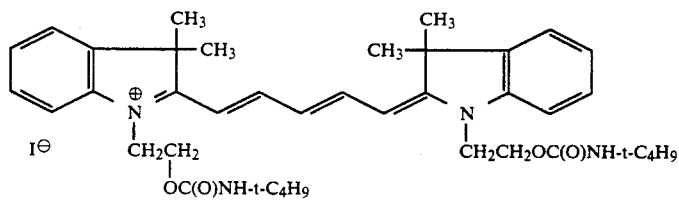 | 654 (CH$_2$Cl$_2$) |
| 43 | 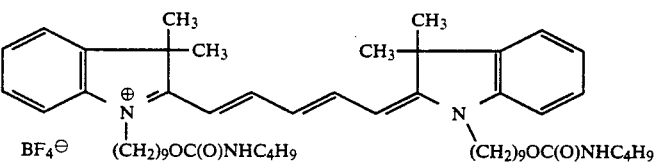 | 654 (CH$_2$Cl$_2$) |
| 44 | 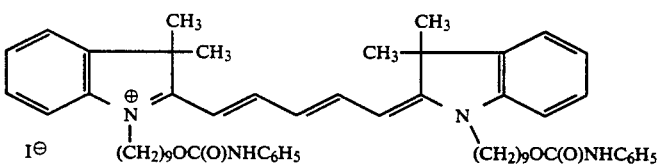 | 654 (CH$_2$Cl$_2$) |
| 45 | 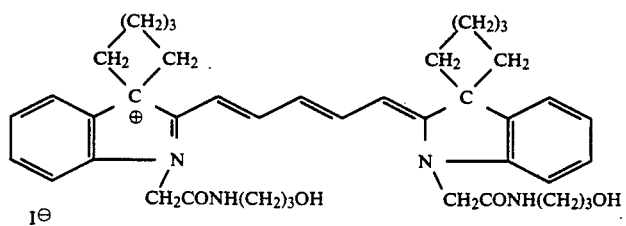 | 753 (EtOH) |

| Example No. | | $\lambda_{max}$ [nm] |
|---|---|---|
| 46 | 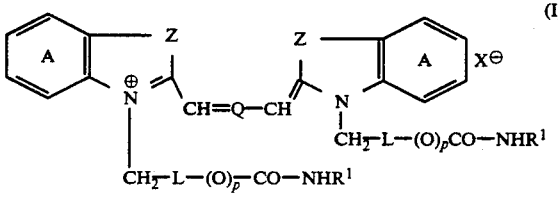 | 755 (EtOH) |

B) USE EXAMPLE

EXAMPLE 47

A 2.5% strength by weight solution of dye No. 1 in 80:20 v/v ethanol/diacetone alcohol containing 30% by weight, based on the solids content of the solution, of an MMA/MAS copolymer was applied to a grooved polycarbonate substrate by spincoating at 1800 rpm. The film thus obtained was homogeneous and highly reflective. The tracking grooves were clearly visible. The film was very readily writable with a semiconductor laser ($\lambda_{max}$=830 nm). The written information can be read out again with high contrast.

EXAMPLE 48

A 2.5% strength by weight solution of dye No. 6 in 80:20 v/v ethanol/diacetone alcohol containing 30% by weight, based on the solids content of the solution, of a phenolic resin as binder was applied to a grooved polycarbonate substrate by spincoating in the manner of Example 1. This produced a homogeneous, highly reflective dye layer which was very readily writable with a semiconductor laser. The tracking grooves were clearly visible. The written information was stable to hot-moist conditions and can be read out again with high contrast.

EXAMPLE 49

A 2.5% strength by weight solution of dye No. 23 in 80:20 v/v ethanol/diacetone alcohol containing 30% by weight of a phenolic resin as binder was applied to a polycarbonate disk by spincoating at 1800 rpm. The dye film obtained was homogeneous and highly reflective. It was sensitively writable with a semiconductor laser. The written information can be read out again with high contrast as often as desired.

We claim:

1. A polymethine dye of the formula I

![Formula I]

where
p is 0 or 1,
Z is isopropylidene or cyclohexylidene,
Q is a radical of the formula

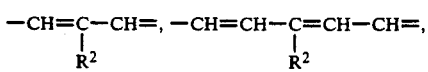

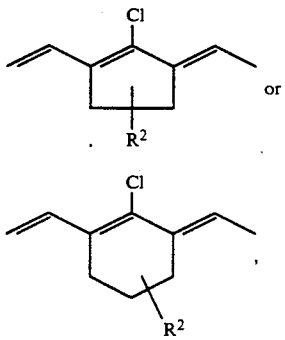

where $R^2$ is hydrogen, chlorine, bromine or $C_1$-$C_2$-alkyl,
L is a single bond or is $C_1$-$C_{12}$-alkylene,
$R^1$ is $C_1$-$C_{20}$-alkyl; $C_1$-$C_{20}$-alkyl substituted by hydroxyl, halogen or phenyl and/or interrupted by one to three oxygen atoms in ether function; $C_5$-$C_7$-cycloalkyl; $C_5$-$C_7$-cycloalkyl substituted by $C_1$-$C_4$-alkyl, chloro or bromo; phenyl or phenyl substituted by members independently selected from the group consisting of $C_1$-$C_4$-alkyl, $C_1$-$C_4$-alkoxy and halo;
$X^\ominus$ is an anion, and
the rings A may each be substituted by members independently selected from the group consisting of $C_1$-$C_6$-alkyl, halo, hydroxy, $C_1$-$C_6$-alkoxy, cyano, amino, $C_1$-$C_6$-alkylamino, di-($C_1$-$C_6$-alkyl)amino, and phenyl or they can be benzofused.

2. A polymethine dye as claimed in claim 1, wherein Z is isopropylidene or cyclohexylidene, and
$R^1$ is $C_1$-$C_{20}$-alkyl; $C_1$-$C_{20}$-alkyl substituted by phenyl or hydroxyl and/or interrupted by from 1 to 3 oxygen atoms in ether function; $C_5$-$C_7$-cycloalkyl or phenyl.

3. A polymethine dye as claimed in claim 1, wherein Z is isopropylidene or cyclohexylidene,
Q is a radical of the formula

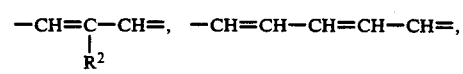

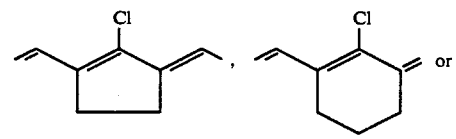

-continued
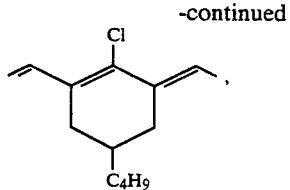
where $R^2$ is hydrogen, chlorine, bromine or methyl,
L is a single bond or is $C_1$-$C_6$-alkylene,
$R^1$ is $C_1$-$C_{20}$-alkyl; $C_1$-$C_{18}$-alkyl substituted by phenyl or hydroxyl and/or interrupted by from 1 to 3 oxygen atoms in ether function; cyclohexyl or phenyl, and
the rings A may each be substituted by chlorine or benzofused.
* * * * *